E. R. CLARK.
ATTACHMENT FOR AUTOMOBILES AND THE LIKE.
APPLICATION FILED DEC. 22, 1920.
1,407,187. Patented Feb. 21, 1922.
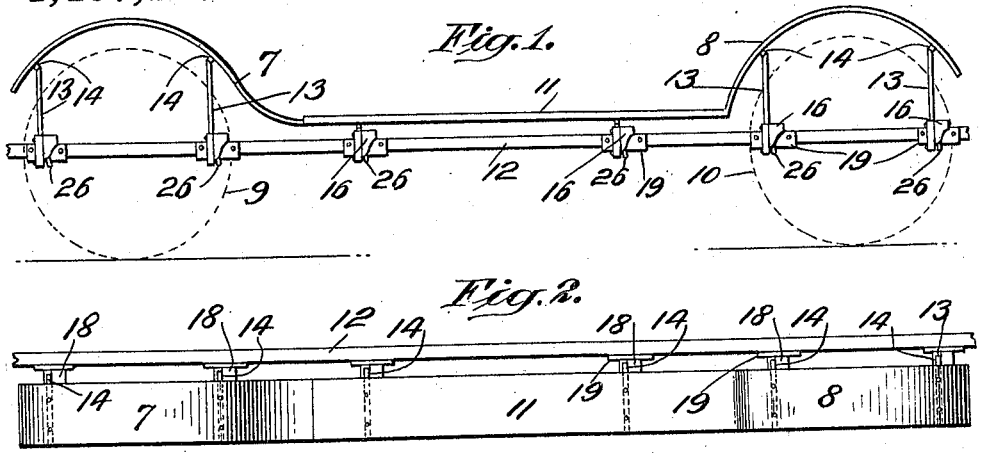
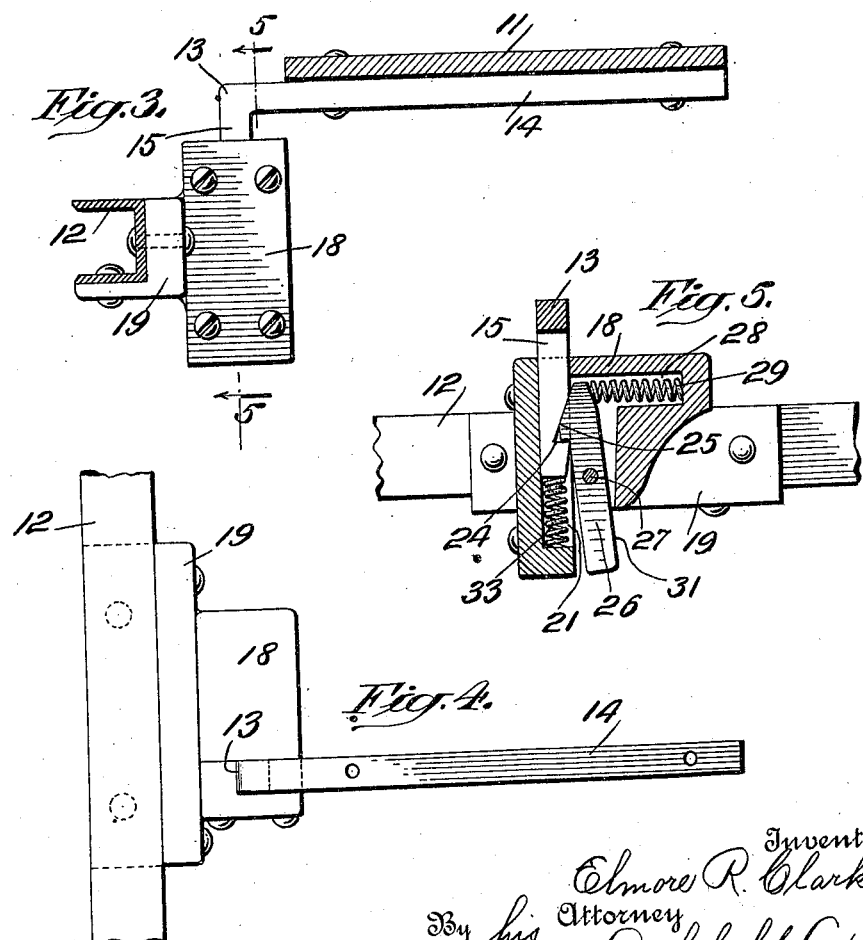
Inventor
Elmore R. Clark
By his Attorney
Archibald Cox

UNITED STATES PATENT OFFICE.

ELMORE R. CLARK, OF NEW BRUNSWICK, NEW JERSEY.

ATTACHMENT FOR AUTOMOBILES AND THE LIKE.

1,407,187.    Specification of Letters Patent.    Patented Feb. 21, 1922.

Application filed December 22, 1920. Serial No. 432,387.

*To all whom it may concern:*

Be it known that I, ELMORE R. CLARK, a citizen of the United States, residing in New Brunswick, in the county of Middlesex, in the State of New Jersey, have invented certain new and useful Improvements in Attachments for Automobiles and the like, of which the following is a specification.

The present invention relates to an attachment for automobiles and the like.

When an automobile or other vehicle is undergoing repairs or otherwise, it is often found desirable or necessary to remove the mud guards therefrom in order to provide a more convenient and ready access to the main body of the vehicle. So far as known, mud guards have heretofore been so attached to the vehicle that the removal thereof has been unnecessarily time consuming and a matter of more or less difficulty. One of the objects of the invention is to provide automobiles and the like vehicles with attachments whereby the mud guards and associated structures may be detachably held in place on the vehicle and be removable therefrom with the expenditure of a minimum of effort and time. Another object of the invention is to so construct the improved attachment for automobiles and the like that when the mud guard is in place on the vehicle it will be held there firmly. These and other objects of the invention which will appear hereinafter as the description proceeds are accomplished in the improved attachment for automobiles described in the following specification and particularly pointed out in the appended claims.

The preferred form of the invention is illustrated in the accompanying drawings in which Fig. 1 is a diagrammatic view showing the improved attachment in side elevation; Fig. 2 is a top plan of the parts shown in Fig. 1; Fig. 3 is an enlarged transverse section taken across the mud guard and means for supporting it in place on the frame of the automobile; Fig. 4 is a top plan of the parts shown in Fig. 3 with the mud guard removed; and Fig. 5 is a section taken along the line 5—5 of Fig. 3.

The improved attachment for automobiles as illustrated in the drawings comprises the mud guard proper and means for detachably securing it to the frame or chassis of the automobile or other vehicle. In Fig. 1 there are shown two mud guards 7 and 8, which are used in connection with the front and rear wheels 9 and 10 respectively (shown in dotted lines), of one side of the automobile or other vehicle on which the attachment is used. The mud guards 7 and 8 are connected by the running board 11. The frame or chassis of the automobile is indicated at 12. The mud guards and the running board are supported by a series of brackets 13 which are in the form of angle irons as clearly shown in Fig. 3, the cross piece 14 of the bracket extending under the mud guards or the running board, as the case may be, and the upright piece 15 being adapted to be engaged by the device for detachably holding the mud guards and running board in place. This device for detachably holding the mud guards and running boards in place is generally indicated by the reference character 16 and comprises a casing 18 supported from an angle-iron bracket 19 which is adapted to be secured to the frame or chassis of the automobile. One end of the casing 18 is provided with an upright hole or recess 21 adapted to receive the upright portion 15 of the mud guard supporting bracket. By reference to Fig. 5 it will be seen that in the lower end of the upright portion 15 of the bracket is a V-shaped notch 24. This notch 24 is adapted to be engaged by the hook end 25 of a latch 26 pivotally connected to the casing 18 at 27. In the upper end of the casing is a longitudinal recess 28 which receives a spring 29 for forcing the hook end 25 of the latch 26 into the notch 24 of the upright portion 15 of the bracket to thereby securely and detachably hold the bracket and the mud guard in place on the frame of the automobile. It will be understood that all the devices 16 are alike in construction and the description of one is sufficient for all.

The frame work or chassis of the automobile or other vehicle is provided at the proper places with the holding devices 16 which are permanently secured to the frame or chassis of the vehicle. The relative positions of the series of holding devices 16 correspond to the relative positions of the brackets for supporting the mud guards and the running board. That is to say, for each bracket there will be a corresponding holding device properly positioned on the frame. The mud guards and running board are placed in position on the automobile or other vehicle by holding the upright pieces 15 of the brackets 13 over the open upper ends of the upright holes 21 in the holding devices 16. Each bracket 13 is then pushed down until the latch 26 engages with the notch 24 in the bracket. It will be understood, of course, that there is a sufficient flexibility in the mud guards and running board to permit each bracket to be separately secured in operative position. When it is desired to remove the mud guards from the automobile each latch 26 is separately operated by striking the rear lower end 31 thereof either with the hand or with some implement. This single movement releases the hook end 25 of the latch from the notch 24 in the bracket, and thereupon a spring 33 positioned in the lower end of the hole 21 forces the bracket upwardly and the notch 24 beyond the hook end 25 of the latch and so out of engagement range of the latch. When all the latches have been operated, each by a single movement, to release the brackets from the latches, the mud guards and the running board may then be removed as a unit.

It will have been observed from the foregoing description of the mode of operation of the improved attachment for automobiles and other vehicles, that a holding device for mud guards and the like has been produced by which the mud guard can be attached to and detached from the vehicle at a minimum expenditure of effort and time, and that when the mud guard is in place on the vehicle it is securely held there until removed.

Having thus described the invention, what I claim as new is:—

1. An attachment for automobiles and the like, comprising a mud guard, a bracket, having a notch therein, for supporting the mud guard, and a spring-pressed latch mounted on the frame of the automobile adapted to engage the notch of the bracket to detachably hold the mud guard in place.

2. An attachment for automobiles and the like, comprising a mud guard, a bracket for supporting the mud guard, means mounted on the frame of the automobile for engaging the bracket to detachably hold the mud guard in place, and means operative when the holding means has been actuated, to force the bracket out of effective holding range of the holding means.

3. An attachment for automobiles and the like, comprising a mud guard and bracket, the bracket having a notch therein, a latch mounted on the frame of the automobile and spring-pressed into engagement with the notch of the bracket for detachably holding the mud guard in place, and means for forcing the bracket out of engagement range of the latch when the latter has been operated.

ELMORE R. CLARK.